United States Patent

Rosenberger

(10) Patent No.: US 7,922,859 B2
(45) Date of Patent: Apr. 12, 2011

(54) LASER-WELDABLE POLYMERS

(75) Inventor: Silvia Rosenberger, Bodenheim (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 444 days.

(21) Appl. No.: 11/665,748

(22) PCT Filed: Sep. 28, 2005

(86) PCT No.: PCT/EP2005/010459
§ 371 (c)(1),
(2), (4) Date: Apr. 19, 2007

(87) PCT Pub. No.: WO2006/042623
PCT Pub. Date: Apr. 27, 2006

(65) Prior Publication Data
US 2008/0004363 A1     Jan. 3, 2008

(30) Foreign Application Priority Data
Oct. 20, 2004 (DE) .................. 10 2004 051 246

(51) Int. Cl.
*B23K 26/00* (2006.01)
*C08K 3/32* (2006.01)
*B29C 65/00* (2006.01)
*B32B 37/00* (2006.01)

(52) U.S. Cl. ........... 156/272.8; 522/83; 522/157; 522/2; 524/413; 524/414

(58) Field of Classification Search ...... 522/2, 150–166, 522/83; 156/272.8; 524/413, 414
See application file for complete search history.

(56) References Cited

U.S. PATENT DOCUMENTS

| | | | |
|---|---|---|---|
| 5,630,979 A | 5/1997 | Welz et al. | |
| 5,750,318 A * | 5/1998 | Lambert et al. | 430/346 |
| 6,656,315 B2 * | 12/2003 | Sallavanti et al. | 156/272.8 |
| 6,740,191 B2 * | 5/2004 | Clarke et al. | 156/272.8 |
| 6,749,933 B2 * | 6/2004 | Dries et al. | 428/328 |
| 6,911,262 B2 * | 6/2005 | Sallavanti et al. | 428/411.1 |
| 7,166,669 B2 * | 1/2007 | Joachimi et al. | 524/601 |
| 7,172,803 B2 * | 2/2007 | Raupach et al. | 428/198 |
| 7,255,770 B2 * | 8/2007 | Wissman | 156/304.2 |
| 7,374,632 B2 * | 5/2008 | Hornby | 156/272.2 |
| 7,396,428 B2 * | 7/2008 | Matsushima et al. | 156/272.8 |
| 7,713,607 B2 * | 5/2010 | Sugawara et al. | 428/57 |
| 2004/0056006 A1 | 3/2004 | Jones et al. | |
| 2004/0188011 A1 * | 9/2004 | Jones | 156/272.8 |
| 2006/0074165 A1 * | 4/2006 | Gelissen et al. | 524/430 |
| 2006/0172817 A1 * | 8/2006 | Dewanjee | 473/340 |
| 2007/0051461 A1 * | 3/2007 | Pfleging et al. | 156/272.8 |
| 2007/0183918 A1 * | 8/2007 | Monsheimer et al. | 419/1 |
| 2008/0217821 A1 * | 9/2008 | Goring et al. | 264/482 |
| 2009/0044906 A1 * | 2/2009 | Goring et al. | 156/272.8 |

FOREIGN PATENT DOCUMENTS

| | | |
|---|---|---|
| EP | 0 706 897 A | 4/1996 |
| EP | 1 117 502 B | 7/2001 |

* cited by examiner

*Primary Examiner* — Susan W Berman
(74) *Attorney, Agent, or Firm* — Millen, White, Zelano & Branigan, P.C.

(57) ABSTRACT

The present invention relates to laser-weldable polymers which consist of a laser-transparent part and a laser-absorbent part and can be welded to one another by means of laser light and are distinguished by the fact that the laser-absorbent part comprises, as absorber, copper hydroxide phosphate and/or copper phosphate.

18 Claims, No Drawings

LASER-WELDABLE POLYMERS

The present invention relates to laser-weldable polymers which consist of a laser-transparent part and a laser-absorbent part and are distinguished by the fact that the laser-absorbent part comprises, as absorber, a copper hydroxide phosphate and/or copper phosphate.

Transmission laser welding is a technique which was developed for welding together materials such as plastics. This is achieved by bringing two plastic elements into contact with one another, where one thereof is transparent to laser light and the other is opaque to laser light. The area of contact between the two plastic elements is then exposed to a laser beam. The laser beam passes through the transparent plastic element and is absorbed by the second, opaque plastic element. This causes the opaque plastic element to warm, so that the area of contact between the two plastic elements melts, resulting in the formation of a weld site. The lasers used are usually diode lasers or Nd:YAG lasers having wavelengths between 808-1100 nm. Most polymers are more or less transparent at this wavelength, meaning that the absorption property can be achieved by the addition of additives. The absorber used is usually carbon black. This exhibits very high absorption both in the visible and also in the IR region. Carbon black therefore only allows black as colour. Pale colours and transparent systems are impossible.

EP 1117502 B1 describes a method in which the absorber is applied in the interlayer. This method enables welding of polymers in all colours, even of transparent plastics. The disadvantage of this method is the additional application step of the absorber paste. The weld seam usually also tends to be on the surface. The NIR absorbers used here are of an organic nature and exhibit no or virtually no light scattering.

The additives used for laser marking, such as, for example, antimony, antimony oxide, conductive pigments and $TiO_2$, generally allow colouring in pale colours. They are added to the formulations of the laser-absorbent side and thus facilitate transmissive laser welding without the intermediate step of application of a laser additive to the site to be welded. Weldability is possible, but is not of commercial interest owing to the long process times. Besides the speed, a disadvantage is that the absorption of these additives is lower than that in the case of carbon black. For example, $TiO_2$ is a surface absorber and thus does not allow a large penetration depth of the laser radiation.

On use of more strongly absorbent additives for the laser-absorbent part in transmissive laser welding, the plastic may melt, but stable welding cannot be achieved.

The object of the present invention is therefore to find laser-weldable polymers which enable good welding, even for pale colours, on exposure to laser light. The successful absorbent should therefore have a very pale inherent colour or only have to be employed in very small amounts.

Surprisingly, it has been found that the laser weldability of polymers consisting of a laser-absorbent part and a laser-transparent part can be improved if the laser-absorbent substance used in the laser-absorbent part is a copper hydroxide phosphate and/or copper phosphate.

The present invention therefore relates to laser-weldable polymers consisting of a laser-transparent part and a laser-absorbent part, which can be welded to one another by means of laser light, characterised in that the laser-absorbent part comprises, as absorber, copper hydroxide phosphate and/or copper phosphate.

The addition of a copper hydroxide phosphate or copper phosphate as pale laser-absorbent substance in the laser-absorbent part in concentrations of 0.5 to 10% by weight, preferably 0.5 to 7% by weight, and in particular 0.5 to 5% by weight, based on the laser-absorbent polymer part, produces very good welding.

Suitable copper hydroxide phosphates or copper phosphates are, for example, $Cu_3(PO_4)_2*2Cu(OH)_2$ (CHP=libethenite), basic copper diphosphate $Cu_3(PO_4)_2*Cu(OH)_2$, copper pyrophosphate $Cu_2P_2O_7*H_2O$, $4CuO*P_2O_5*H_2O$, $5CuO*P_2O_5*3H_2O$, $6CuO*P_2O_5*3H_2O$, $4CuO*P_2O_5*3H_2O$, $4CuO*P_2O_5*1.2\ H_2O$, $4\ CuO*P_2O_5$, $4CuO*P_2O_5*1.5\ H_2O$. It is also possible to employ mixtures of the said copper hydroxide phosphates or copper phosphates, where the total concentration and the mixing ratio are not subject to any particular restriction. However, the total concentration should not exceed 10% by weight. Preference is given to the use of a copper hydroxide phosphate, in particular libethenite.

In order to increase the strength of the weld seam and the welding speed, a scattering additive, such as, for example, $TiO_2$, $CaCO_3$ or $MgCO_3$, or other white pigments or fillers, etc., known to the person skilled in the art can optionally be added to the laser-transparent part. Depending on the polymer employed, the additive is employed in amounts of $\leq 2\%$ by weight, preferably $\leq 0.5\%$ by weight and particularly preferably $\leq 0.3\%$ by weight.

Furthermore, an absorber can likewise be added in small amounts to the laser-transparent polymer part. The addition of a scattering absorber in the laser-transparent part generally increases the strength of the weld seam and allows faster welding. Suitable laser-scattering absorbers are conductive pigments, such as, for example, antimony, $Sb_2O_3$, $(Sn,Sb)O_2$, $(Sn,Sb)O_2$-coated mica, $(Sn,Sb)O_2$- and $SiO_2$-coated mica, $TiO_2$-coated mica pigments, copper hydroxide phosphate and copper phosphate. Absorbers of this type are available, for example, from Merck KGaA under the trade name Lazerflair®.

The absorber is preferably added to the laser-transparent polymer part in amounts of 0.001-2% by weight, in particular 0.01-1% by weight and very particularly preferably 0.05-0.5% by weight, based on the polymer part. However, the proportion of absorber in the laser-transparent polymer part is always significantly smaller than in the laser-absorbent part. In general, the laser-absorbent part comprises a 2-20 times, preferably 5-10 times, larger amount of absorber than the laser-transparent part.

The laser-transparent part may comprise both a scattering absorber and a scattering additive. If the scattering absorber is copper hydroxide phosphate or copper phosphate, the absorber in the laser-transparent part and in the laser-absorbent part differs merely in the concentration. The total concentration of scattering absorber and scattering additive in the laser-transparent part should not exceed 2% by weight.

The concentration of the absorber(s) in the respective polymer part is, however, dependent on the plastic system employed. The small proportion of absorber changes the plastic system insignificantly and does not affect its processability.

Furthermore, colorants can be added to the plastics, allowing colour variations of all types and at the same time ensuring retention of the laser welding. Suitable colorants are, in particular, coloured metal-oxide pigments and organic and inorganic pigments and dyes.

The polymers may furthermore also comprise fillers. It is possible to employ all fillers known to the person skilled in the art, such as, for example, natural and synthetic mica, glass beads or glass powder, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances.

Suitable polymers are all plastics known to the person skilled in the art, irrespective of whether they are amorphous, partially crystalline or multi-phase, for example those as described, for example, in Ullmann, Vol. 15, pp. 457 ff., Verlag VCH, such as, for example, polyolefins, in particular polyethylene (PE) and polypropylene (PP), polyamide (PA), polyesters, polyethers, polyphenylene ethers, polyacrylates, polyurethane (PU), polyoxymethylene (POM), polymethacrylates, polymethyl methacrylate (PMMA), polyvinyl acetate (PVAC), polyvinyl acetal (PVB), polystyrene (PS), acrylonitrile-butadiene-styrene (ABS), acrylonitrile-styrene-acrylate (ASA), ABS graft polymers, polyalkylene terephthalates, in particular polybutylene terephthalate (PBT) and polyethylene terephthalate (PET), polyvinyl chloride (PVC), polyvinylidene chloride (PVDC), polyvinylidene fluoride (PVDF), polytetrafluoroethylene (PTFE), polycarbonate (PC), polyether sulfones, polyether ketones, thermoplastic polyurethanes (TPU), thermoplastic elastomers (PTE) and copolymers thereof and/or mixtures thereof. Particular preference is given to thermoplastics.

The doped plastic granules are generally produced by initially introducing the plastic granules into a suitable mixer, wetting them with any additives and then adding and mixing-in the absorber. Scattering additives, adhesives, organic polymer-compatible solvents, stabilisers and/or surfactants which are temperature-stable under the working conditions can optionally be added to the plastic granules during incorporation of the absorber. The plastic is generally pigmented via a colour concentrate (masterbatch) or compound. The mixture obtained in this way can then be processed directly in an extruder or an injection-moulding machine. The mouldings formed during processing exhibit a very homogeneous distribution of the absorber. Finally, the laser welding is carried out using a suitable laser.

The invention also relates to a process for the preparation of the laser-weldable polymers according to the invention, characterised in that the laser-absorbent polymer part and optionally the laser-transparent polymer part are mixed with the respective absorber and optionally further additives and auxiliaries and then shaped with exposure to heat.

The laser welding is carried out by introducing the specimen into the ray path of a continuous wave laser, preferably an Nd:YAG or diode laser. The wavelengths are preferably between 808 and 1100 nm. Since most polymers are more or less transparent at these wavelengths, the absorption property is achieved by the addition of additives. Weldings using other conventional types of laser are also possible if they operate at a wave-length at which the absorber used exhibits high absorption. The welding is determined by the irradiation time and irradiation power of the laser and the plastic system used. The power of the lasers used depends on the respective application and can readily be determined by the person skilled in the art in the individual case.

The laser used generally has a wavelength in the range from 157 nm to 10.6 μm, preferably in the range from 800 nm to 1200 nm. For example, Nd:YAG lasers (1064 nm) or diode lasers (750-1050 nm, preferably 808 nm, 940 nm or 980 nm) may be mentioned here. Particular preference is given to the use of Nd:YAG lasers (1064 nm) and diode lasers of various wavelength. The commonest wavelengths for diode lasers are 808 nm, 940 nm and 980 nm. The lasers for the laser welding of polymers have a power of 30-200 watts, preferably 50-160 watts. Corresponding lasers which are suitable for the laser welding of the polymers according to the invention are commercially available.

Laser welding with the polymers doped in accordance with the invention can be carried out in all areas where conventional joining methods have hitherto been employed and where it has hitherto not been possible to employ the welding process owing to the laser-transparent polymers and pale colours. The laser-transmissive plastic welding process thus represents an alternative to conventional joining methods, for example high-frequency welding, vibration welding, ultra-sound welding, hot-air welding or also the adhesive bonding of plastic parts.

The laser welding of plastic articles or mouldings which consist of the polymer parts doped in accordance with the invention is thus possible.

The following examples are intended to explain the invention, but without limiting it. The percentages indicated are percent by weight.

EXAMPLES

The welding experiments are carried out using a 150 W diode laser (940 nm).

PP platelets with a thickness of 1.5 mm are used both for the laser-transparent side and also for the laser-absorbent side with various additives and colorants. The copper hydroxide phosphate employed is libethenite.

As comparative system, natural PP is welded to PP comprising 1% of Lazerflair® 820 (electroconductive laser pigment from Merck KGaA). A welding speed of 40 mm/s is achieved here. This corresponds to an energy per unit length of 37.5 J/cm.

Example 1

| Laser-transparent part: | natural PP |
|---|---|
| Laser-absorbent part: | PP comprising 1% of copper hydroxide phosphate |

A welding speed of 60 mm/s is achieved here. This corresponds to an energy per unit length of 25 J/cm.

Example 2

| Laser-transparent part: | PP comprising 0.1% of Lazerflair ® 820 |
|---|---|
| Laser-absorbent part: | PP comprising 1% of copper hydroxide phosphate |

A welding speed of 120 mm/s is achieved here. This corresponds to an energy per unit length of 12.5 J/cm.

Example 3

Formulation with $TiO_2$ for pale plastic formulations:

| Laser-transparent part: | PP comprising 0.1% of Lazerflair ® 820 |
|---|---|
| Laser-absorbent part: | PP comprising 0.5% of copper hydroxide phosphate and 0.5% of $TiO_2$ |

A welding speed of 150 mm/s is achieved here. This corresponds to an energy per unit length of 10 J/cm.

In the strength testing, all samples are torn in the basic material and not in the weld seam. The examples given show that the use of a strong absorber on the absorbent side and optionally the use of a weak absorber on the laser-transparent side accelerates the welding speed by a factor of >3 and the energies per unit length are thus only ⅓ of the starting material.

The values for total transmission, diffuse transmission and total reflection of the plastic platelets used are measured using a Perkin-Elmer instrument (Lamda 900) with Ulbricht sphere. The absorption shown in Table 1 is calculated from total transmission and total reflection (100%=A+R+T):

TABLE 1

| Absorption | |
|---|---|
| | 800-1200 nm |
| Laser-absorbent parts | |
| Comparative system | 40-70% |
| Examples 1 + 2 | 70-85% |
| Example 3 | 60-75% |
| Laser-transparent parts | |
| Natural PP | 0-5% |
| Examples 2 + 3 | 10-12% |

The light scattering in the case of the laser-scattering absorber in Examples 2 and 3 in the range 800-1200 nm is 40% (at 1200 nm) to 60% (at 800 nm).

The invention claimed is:

1. A laser-weldable polymer consisting of a laser-transparent part and a laser-absorbent part, which can be welded to one another by laser light, wherein the laser-absorbent part comprises, as absorber, copper hydroxide phosphate and/or copper phosphate, wherein both the laser-absorbent part and the laser-transparent part comprise an absorber such that the laser-absorbent part comprises a 2 to 20 times larger amount of absorber than the laser-transparent part.

2. A laser-weldable polymer according to claim 1, wherein the copper hydroxide phosphate or copper phosphate is $Cu_3(PO_4)_2 \cdot 2Cu(OH)_2$ (CHP=libethenite), $Cu_3(PO_4)_2 \cdot Cu(OH)_2$, $Cu_2P_2O_7 \cdot H_2O$, $4CuO \cdot P_2O_5 \cdot H_2O$, $5CuO \cdot P_2O_5 \cdot 3H_2O$, $6CuO \cdot P_2O_5 \cdot 3H_2O$, $4CuO \cdot P_2O_5 \cdot 3H_2O$, $4CuO \cdot P_2O_5 \cdot 1.2 H_2O$, $4 CuO \cdot P_2O_5$, or $4CuO \cdot P_2O_5 \cdot 1.5 H_2O$.

3. A laser-weldable polymer according to claim 1, wherein the laser-absorbent part comprises copper hydroxide phosphate and/or copper phosphate in an amount of 0.5-10% by weight, based on the laser-absorbent part.

4. A laser-weldable polymer according to claim 1, wherein the laser-transparent part comprises a laser-scattering absorber.

5. A laser-weldable polymer according to claim 4, wherein the laser-scattering absorber is a conductive pigment, antimony, $Sb_2O_3$, $(Sn,Sb)O_2$, $(Sn,Sb)O_2$-coated mica, $(Sn,Sb)O_2$- or $SiO_2$-coated mica, $TiO_2$-coated mica pigment, copper hydroxide phosphate or copper phosphate, or a combination thereof.

6. A laser-weldable polymer according to claim 4, wherein the laser-scattering absorber is present in the laser-transparent part in an amount of 0.001-2% by weight, based on the laser-transparent part.

7. A laser-weldable polymer according to claim 1, wherein the laser-transparent part comprises a laser-scattering additive.

8. A laser-weldable polymer according to claim 7, wherein the laser-scattering additive is $TiO_2$, $CaCO_3$, $MgCO_3$, glass beads or a mixture thereof.

9. A laser-weldable polymer according to claim 7, wherein the laser-scattering additive is present in the laser-transparent part in amounts of ≦1% by weight, based on the laser-transparent part.

10. A laser-weldable polymer according to claim 1, wherein the laser-weldable polymer parts are welded using a diode laser or Nd:YAG laser.

11. A laser-weldable polymer according to claim 1, wherein the laser-weldable polymer is a thermoplastic.

12. A laser-weldable polymer according to claim 1, wherein the polymer is a polyolefin, polyamide (PA), polyester, polyether, polyphenylene ether, polyacrylate, polyurethane (PU), polyoxymethylene (POM), polymethacrylate, polymethyl methacrylate (PMMA), polyvinyl acetate (PVAC), polyvinyl acetal (PVB), polystyrene (PS), acrylonitrile-butadiene-styrene (ABS), acrylonitrile-styrene-acrylate (ASA), ABS graft polymer, polyalkylene terephthalate, polyvinyl chloride (PVC), polyvinylidene chloride (PVDC), polyvinylidene fluoride (PVDF), polytetrafluoroethylene (PTFE), polycarbonate (PC), polyether sulfone, polyether ketone, thermoplastic polyurethane (TPU), thermoplastic elastomer (PTE) or a copolymer thereof and/or a mixture thereof.

13. A laser-weldable polymer according to claim 1, wherein both the laser-absorbent part and the laser-transparent part comprise an absorber such that the laser-absorbent part comprises a 10 times larger amount of absorber than the laser-transparent part.

14. A laser-weldable polymer according to claim 1, wherein both the laser-absorbent part and the laser-transparent part comprise an absorber such that the laser-absorbent part comprises a 5 to 10 times larger amount of absorber than the laser-transparent part.

15. A laser-weldable polymer according to claim 1, which is transparent.

16. A laser-weldable polymer according to claim 1, which is pale in color.

17. A process for preparing a laser-weldable polymer according to claim 1, comprising adding the absorber and optionally further additives and auxiliaries to the laser-absorbent part and optionally to the laser-transparent part, and then shaping the polymer under the action of heat.

18. A method for laser-transmissive welding, comprising subjecting a laser-weldable polymer according to claim 1 to transmissive laser welding.

* * * * *